(12) United States Patent
Mangalore et al.

(10) Patent No.: US 10,708,326 B2
(45) Date of Patent: Jul. 7, 2020

(54) SECURE MEDIA CASTING BYPASSING MOBILE DEVICES

(71) Applicant: ARRIS Enterprises LLC, Suwanee, GA (US)

(72) Inventors: Geetha Mangalore, San Diego, CA (US); Nicol C. P. So, Newtown, PA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 15/942,398

(22) Filed: Mar. 30, 2018

(65) Prior Publication Data

US 2018/0288117 A1 Oct. 4, 2018

Related U.S. Application Data

(60) Provisional application No. 62/478,723, filed on Mar. 30, 2017.

(51) Int. Cl.
| | |
|---|---|
| *G06F 15/16* | (2006.01) |
| *H04L 29/06* | (2006.01) |
| *H04L 29/12* | (2006.01) |
| *H04L 9/32* | (2006.01) |
| *H04L 9/08* | (2006.01) |
| *H04L 29/08* | (2006.01) |
| *G06F 21/10* | (2013.01) |

(52) U.S. Cl.
CPC ......... *H04L 65/4069* (2013.01); *G06F 21/10* (2013.01); *H04L 9/0819* (2013.01); *H04L 9/3263* (2013.01); *H04L 9/3268* (2013.01); *H04L 9/3273* (2013.01); *H04L 61/1511* (2013.01); *H04L 61/2007* (2013.01); *H04L 61/304* (2013.01); *H04L 65/4084* (2013.01); *H04L 65/604* (2013.01); *H04L 65/607* (2013.01); *H04L 67/146* (2013.01); *H04L 63/0869* (2013.01); *H04L 63/166* (2013.01); *H04L 2209/603* (2013.01)

(58) Field of Classification Search
CPC .. H04H 63/0428; H04H 67/26; H04H 67/104; H04H 67/2842; H04N 21/816; H04N 21/41407; G06F 21/10; H04L 12/2818; H04L 61/1511
See application file for complete search history.

(56) References Cited

U.S. PATENT DOCUMENTS

| | | | |
|---|---|---|---|
| 9,819,648 B1 * | 11/2017 | Chilakapati | ......... H04L 63/0428 |
| 2003/0097564 A1 | 5/2003 | Tewari et al. | |
| 2005/0131831 A1 * | 6/2005 | Fieldson | ................. G06F 21/10 |
| | | | 705/59 |

(Continued)

OTHER PUBLICATIONS

PCT International Search Report & Written Opinion, Re: Application No. PCT/US2018/025593, dated Jun. 7, 2018.

*Primary Examiner* — Dustin Nguyen
(74) *Attorney, Agent, or Firm* — Gates & Cooper LLP

(57) ABSTRACT

A method is provided for secure and direct delivery of digital media content directly from a content server to a casting digital media player. In the method, the digital media player is provided with a custom URL that contains concatenated information related to the IP address associate with the location of a key on a mobile device used to commence a casting session.

9 Claims, 11 Drawing Sheets

(56) References Cited

U.S. PATENT DOCUMENTS

| | | | |
|---|---|---|---|
| 2005/0177624 A1* | 8/2005 | Oswald | H04L 67/104 709/219 |
| 2007/0214232 A1* | 9/2007 | Belimpasakis | H04L 12/2818 709/217 |
| 2011/0225417 A1* | 9/2011 | Maharajh | G06F 21/10 713/150 |
| 2013/0166906 A1 | 6/2013 | Swaminathan et al. | |
| 2014/0012898 A1* | 1/2014 | Mittal | H04N 21/41407 709/203 |
| 2014/0109166 A1* | 4/2014 | Koreeda | H04N 21/816 725/134 |
| 2015/0052253 A1* | 2/2015 | Johnson | H04L 61/1511 709/226 |
| 2016/0050288 A1* | 2/2016 | Ueno | H04L 67/2842 709/218 |
| 2016/0072774 A1* | 3/2016 | McRae | H04L 63/0428 713/168 |
| 2016/0316006 A1* | 10/2016 | Zhang | H04L 61/1511 |
| 2017/0134452 A1* | 5/2017 | Belimpasakis | H04L 67/26 |

* cited by examiner

700 # SECURE MEDIA CASTING BYPASSING MOBILE DEVICES

CROSS REFERENCE TO RELATED APPLICATIONS

This Application claims priority under 35 U.S.C. § 119(e) from earlier filed U.S. Provisional Application Ser. No. 62/478,723, filed Mar. 30, 2018, the entirety of which is incorporated herein by reference.

BACKGROUND

Technical Field

The present application relates generally to the field of delivery of protected media content for display and more specifically to a system and method for efficient, secure media casting from mobile devices.

Related Art

BACKGROUND

Chromecast (a digital media device made by Google) can be used to "cast" media to a TV from a portable device or from a Chrome web browser. "Casting" here means the transfer or mirroring of a media viewing session from a sender device to a Google Cast device, of which the Chromecast is an example. Chromecast supports DASH, Smooth Streaming and HLS technologies for streaming media delivery. A Google Cast device is connected to the TV, for example, using an HDMI connector. Google Cast enables rendering of media in three modes, namely: mirroring, remote display, and by transferring the streaming playback session to the Google Cast device. In the first two cases the content decoding happens on the sender device. In the third case, decoding of streaming media content is done by the Google Cast. Google Cast devices have built-in support for Widevine and PlayReady DRM (digital rights management) technologies. With HLS streaming, content protection is supported using AES-128 encryption. The Chromecast API defined in JavaScript mainly covers the media player interface and receiver functions. Only the developer of Google Cast technology, namely Google, has the ability to add support for additional DRM technologies to Google Cast; independent application developers do not have the ability to install clients for additional DRM technologies on Google Cast devices.

A solution that would enable transferring a playback session of streaming media content protected using a non-native content protection technology (e.g. SecureMedia® from ARRIS International plc) from a mobile device to a Google Cast-like device, without adding a client of the non-native DRM to the device or resorting to screen mirroring, would be desirable. Such a solution would put all or substantially all of the workload of retrieving, decrypting, and decoding protected media on the Google Cast device.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: instantiating a key server in memory on a device, determining an IP address of said device, constructing an URL based at least in part on said IP address of said device, delivering said URL to a digital media player, and accessing said URL from said digital media player. Other embodiments of this aspect include corresponding computer systems, apparatus, and computer programs recorded on one or more computer storage devices, each configured to perform the actions of the methods.

Implementations can include one or more of the following features: The method where said device is a mobile computing device. The method further including accessing said URL from said digital media player. The method further including: determining a content key associated with said key server, where constructing said URL is based at least in part on said content key. The method further including: accessing said URL from said digital media player, and receiving a content selection. The method further including: accessing said URL from said digital media player, and receiving a content selection. The method where said constructing said URL includes encoding said IP address in a representation that may be embedded as part of a valid DNS name. The method further including: instantiating a domain name server in memory configured to extract said IP address from said URL. The method where said constructing said URL includes encoding said IP address in a representation that may be embedded as part of a valid DNS name. The method where said digital media player transmits said URL to said domain name server and receives said IP address in response. The method where said digital media player. The method may also include accesses said IP address to obtain a content key. The method may also include accesses a content server to obtain digital content in a protected form. The method may also include transmits said digital content to a display device in a form renderable by said display device based, at least in part, on use of said content key. The method where said constructing said URL includes encoding said IP address in a representation that may be embedded as part of a valid DNS name. The method where said digital media player transmits said URL to a domain name server and receives said IP address in response. The method where said digital media player. The method may also include accesses said IP address to obtain a content key. The method may also include accesses a content server to obtain digital content. The method may also include transmits said digital content to a display device based, at least in part, on use of said content key.

Implementations of the described techniques may include hardware, a method or process, or computer software on a computer-accessible medium.

BRIEF DESCRIPTION OF THE DRAWINGS

Further details of the present invention are explained with the help of the attached drawings in which.

DETAILED DESCRIPTION

Figure 1:
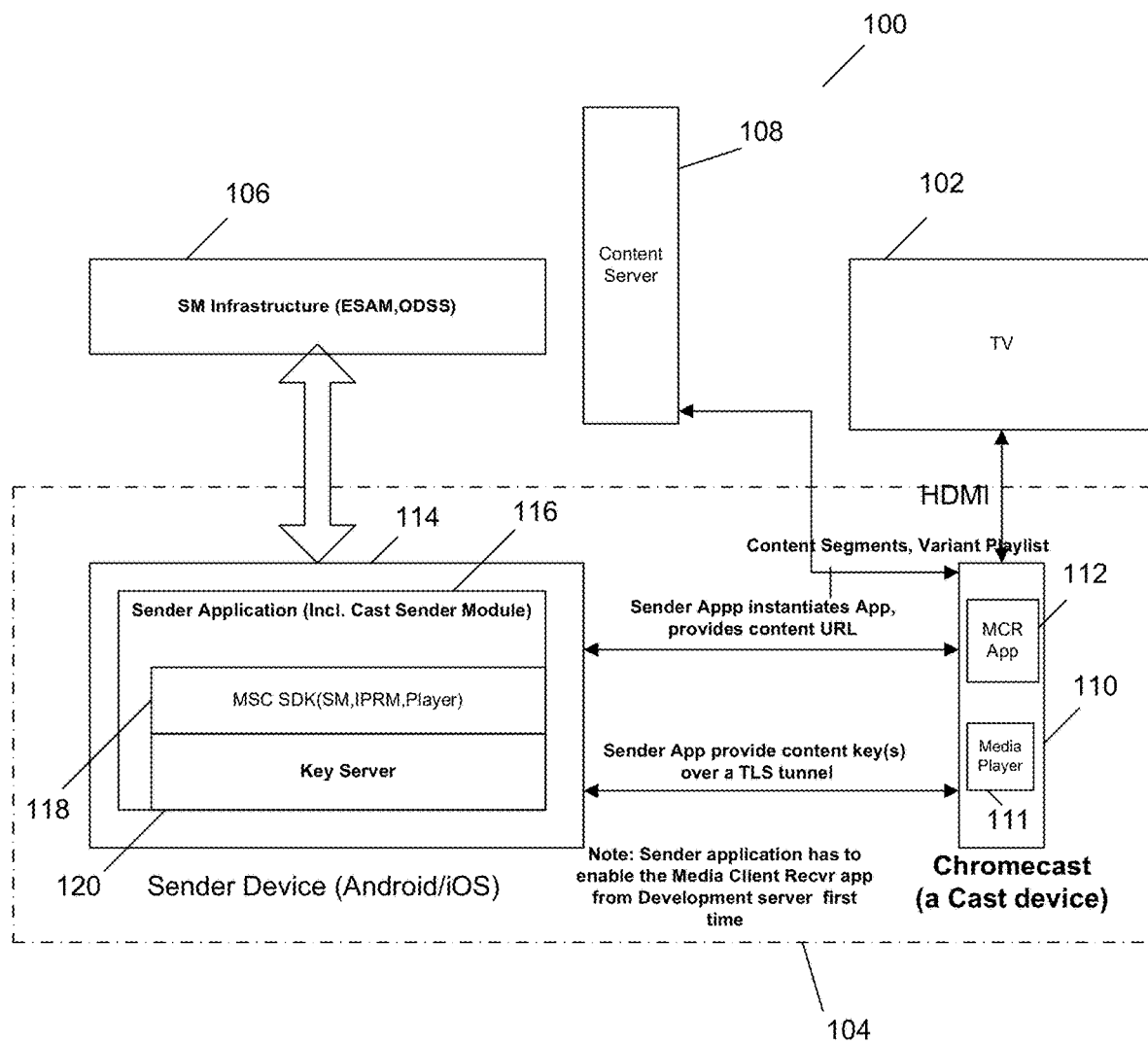
FIG. 1 depicts an embodiment of a typical casting configuration

FIG. 1 depicts an exemplary setup 100 that embodies aspects of the invention. As depicted in FIG. 1, the system 100 comprises a display 102, an acquisition and transmission system 104, a digital rights management system (as used herein SecureMedia® is an exemplary digital rights management system; references to it are intended to encompass any digital rights management system or method in general) (also abbreviated as "DRM" and/or "SM" hereinafter) 106 and a content server 108. In the embodiment depicted in FIG. 1, the acquisition and transmission system 104 may comprise two components: a digital media player device 110 (such as a Chromecast device) having a media player component/instantiation 111 and a sender device 114. In some embodiments, the sender device 114 can be a mobile device running an instance of an operating system, such as iOS or Android. It should be noted that a "mobile device" in the context of this disclosure may or may not be enabled for mobile data services. Devices that use Wi-Fi or other wireless local area network (WLAN) technologies, exclusively or otherwise, are within the meaning of "mobile device". However, in alternate embodiments, the sender device can be any known and/or convenient device capable of networked communication.

In the embodiment depicted in FIG. 1, the digital media player 110 can run an instance of a media client receiver application 112 and the sender device 114 can run instances of a video content player 118 and a key server 120.

In operation, a user can request content on a sender device through an interface or directly through the video content player 118 and the sender device can obtain a key from the key server 120 which is in communication with the SM system 106. Upon verification of the device through the SM system 106, the key server 120 delivers a content URL and decryption keys to media digital media display device 110. The digital media display device 110 obtains digital content from the content server 108 and used the content key(s) provided by the key server to decrypt the obtained content for transmission to the display 102.

Figure 2:
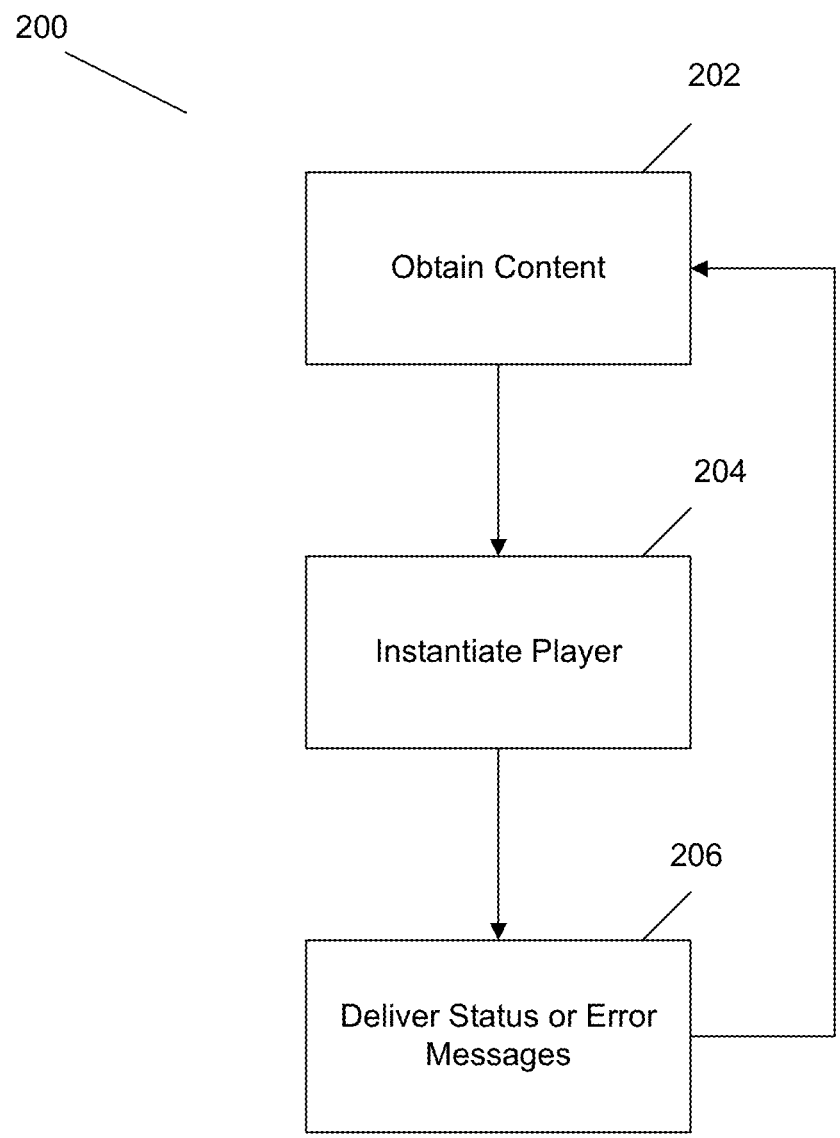
FIG. 2 depicts an embodiment of a method associated with typical error/status notification.

FIG. 2 depicts an embodiment of a method associated with typical error/status notification in the media client receiver application 112. In the embodiment depicted in FIG. 2, in step 202 the content is retrieved or obtained and an instance of a video player is instantiated in step 204. Then in step 206 messages regarding the content such as status or error messages can be generated depending on whether the content was successfully or unsuccessfully decoded and delivered to a display 102.

As SM digital rights management (DRM) cannot be added as part of the media client receiver application in some embodiments, in some embodiments transport layer security (TLS) can be used with mutual authentication (a.k.a. 2-way TLS or mutually authenticated TLS) to deliver the content key from the sender device. As used herein TLS is intended to encompass its predecessor technology, SSL (Secure Sockets Layer). The content key can be served by a key server implemented by the DRM client on the mobile device. The key can be derived or otherwise determined using the DRM client, such as the MSC SDK from ARRIS International plc, in the case of the SecureMedia DRM.

Additionally, in some embodiments, the digital media player 110 can be provisioned with a Google device certificate, and a device proxy server can use the Google root public key for authentication.

Figure 3:
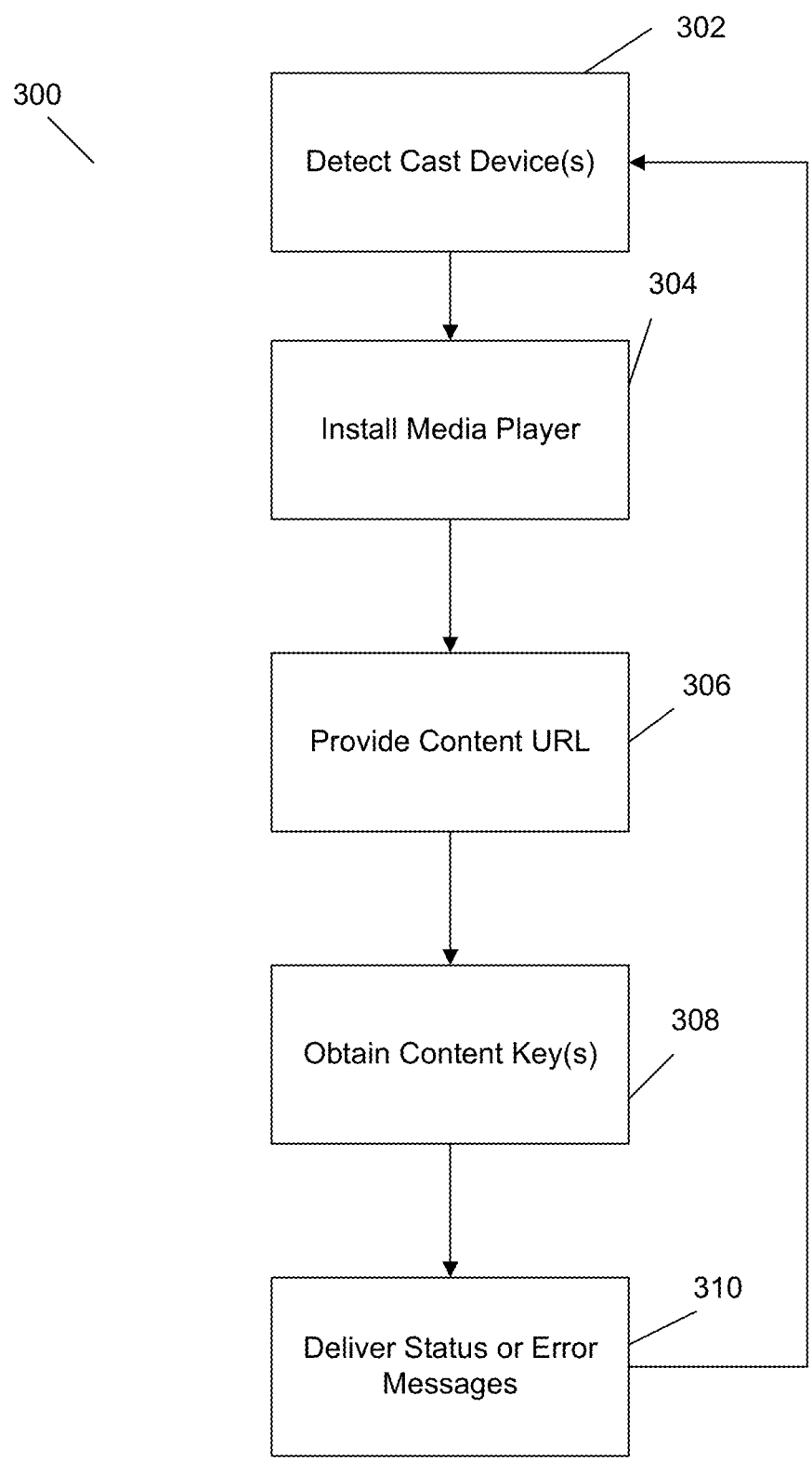
FIG. 3 depicts an alternate embodiment of a method of typical casting session error/status notification.

FIG. 3 depicts an alternate embodiment of a method 300 of associated with a typical casting session error/status notification. In the embodiment depicted in FIG. 3, in step 302 digital media display (cast) devices on a local network can be detected and located. In step 304, an instance of a media player can be instantiated on a detected digital media display (cast) device and then a content URL can be provided to the cast device. Content keys to decode the content can be obtained in step 308. Then in step 310 messages regarding the content such as status or error messages can be generated depending on whether the content was successfully or unsuccessfully decoded and delivered to a display.

Figure 4:
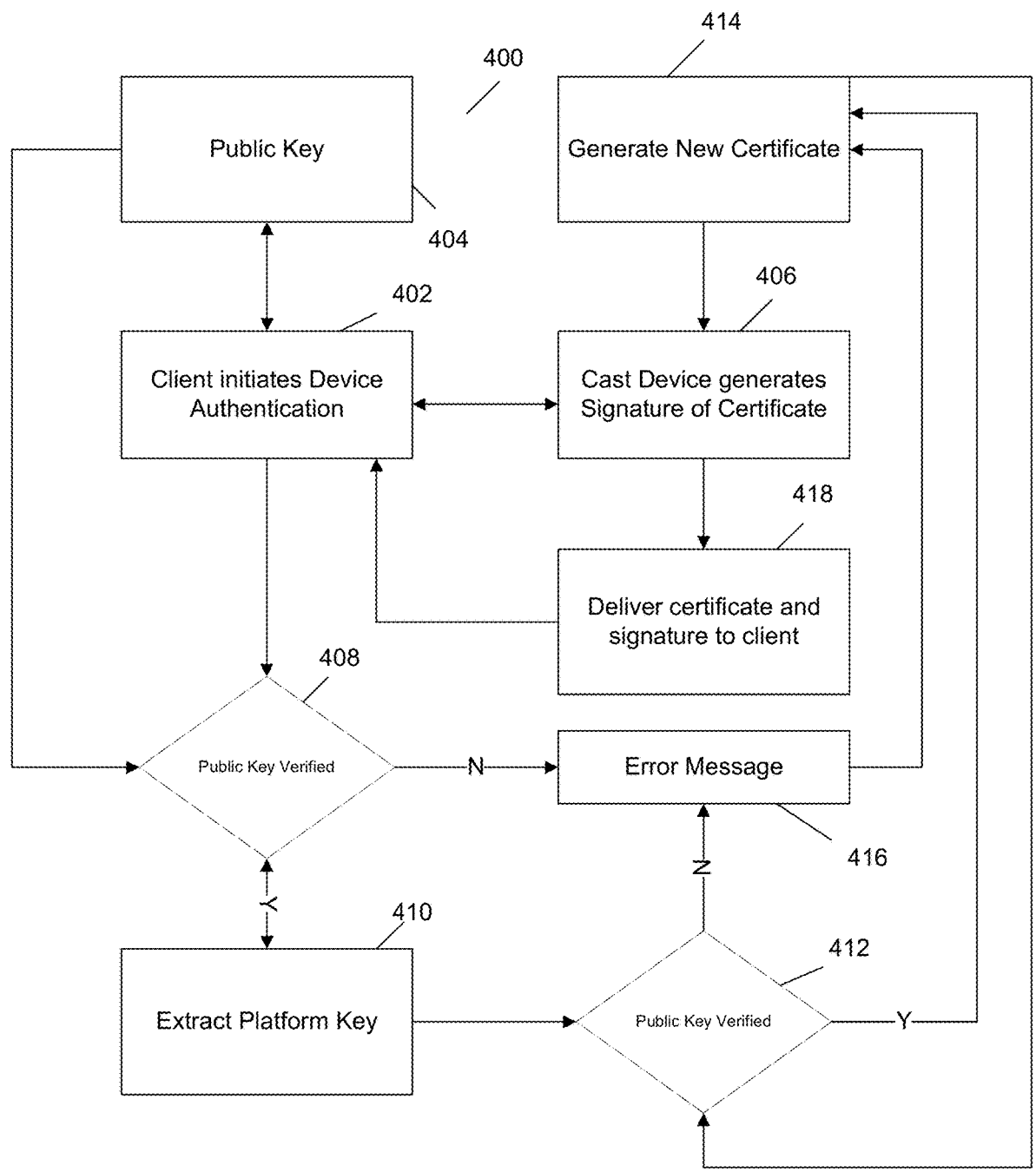
FIG. 4 depicts an embodiment of an authentication method used by a digital media player.

FIG. 4 depicts an embodiment of an authentication method 400 used by a digital media player. In the embodiment depicted in FIG. 4, the authentication method can comprise the steps of device authentication 402, instantiation of a public key 404 a public key, receiving a cast device certificate signature 406, verification of the public key 408, extracting a platform key 410, comparing with the public key 412, generating a new certificate 414, generating an error message 416 and delivering a certificate to a client 418.

In operation in some embodiments, periodically, the Cast device generates a new self-signed TLS peer certificate in step 414. In response, a client (Android device hosting sender app) can send a device authentication (DeviceAuth) challenge beginning with step 402. Then the Cast device can generate a signature of its current peer certificate in step 406 using the platform certificate private key and returns both the platform certificate and the signature to the client. In response, the client can verify that the platform certificate is signed by a trusted CA using its embedded public key and the client can then extract the platform certificate public key and uses it to check that the returned signature matches the peer certificate signed with the platform certificate.

Figure 5:
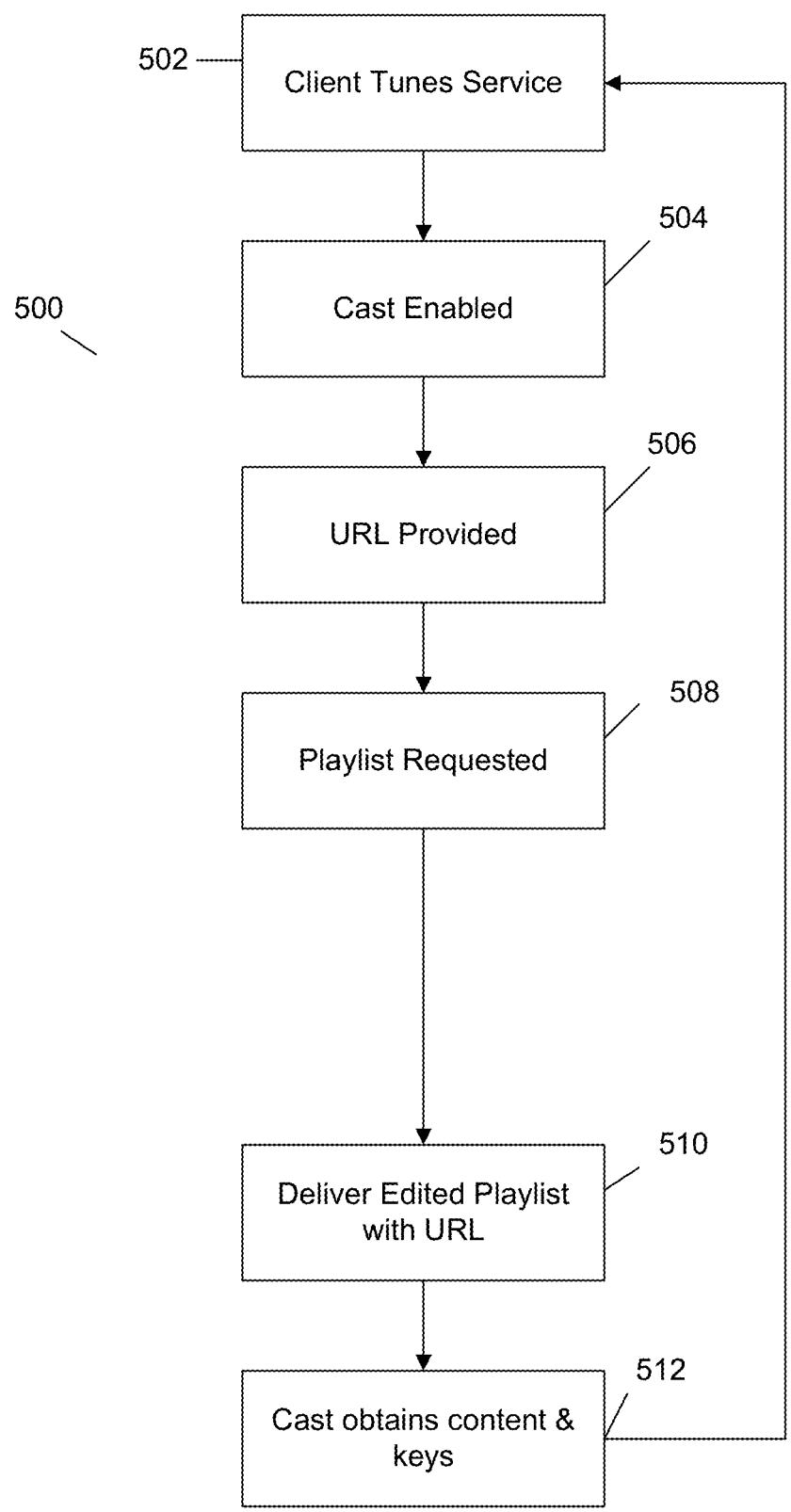
FIG. 5 depicts an embodiment of a system and method for delivery of content to a digital media player.

FIG. 5 depicts an embodiment of a system and method 500 for delivery of content to a digital media player. In the embodiment depicted in FIG. 5, in step 502 a client device can tune or request specific service(s) or content and in response a casting enable request in step 504, the system and method 500 can provide a content URL 506 to the cast device. The cast device can then request a play list in step 508 and an edited playlist with modified a key URL can be delivered to the cast device in step 510. As use here and elsewhere in this disclosure, a "key URL" is a URL used by a media player to obtain a content key. In the case of HLS streaming technology, the URI attribute in an EXT-X-KEY tag in a media playlist would be an example of a key URL.

Then, in step 512 the cast device can obtain the key(s) and desired content and decode and transmit the content to a display 102.

Figure 6:
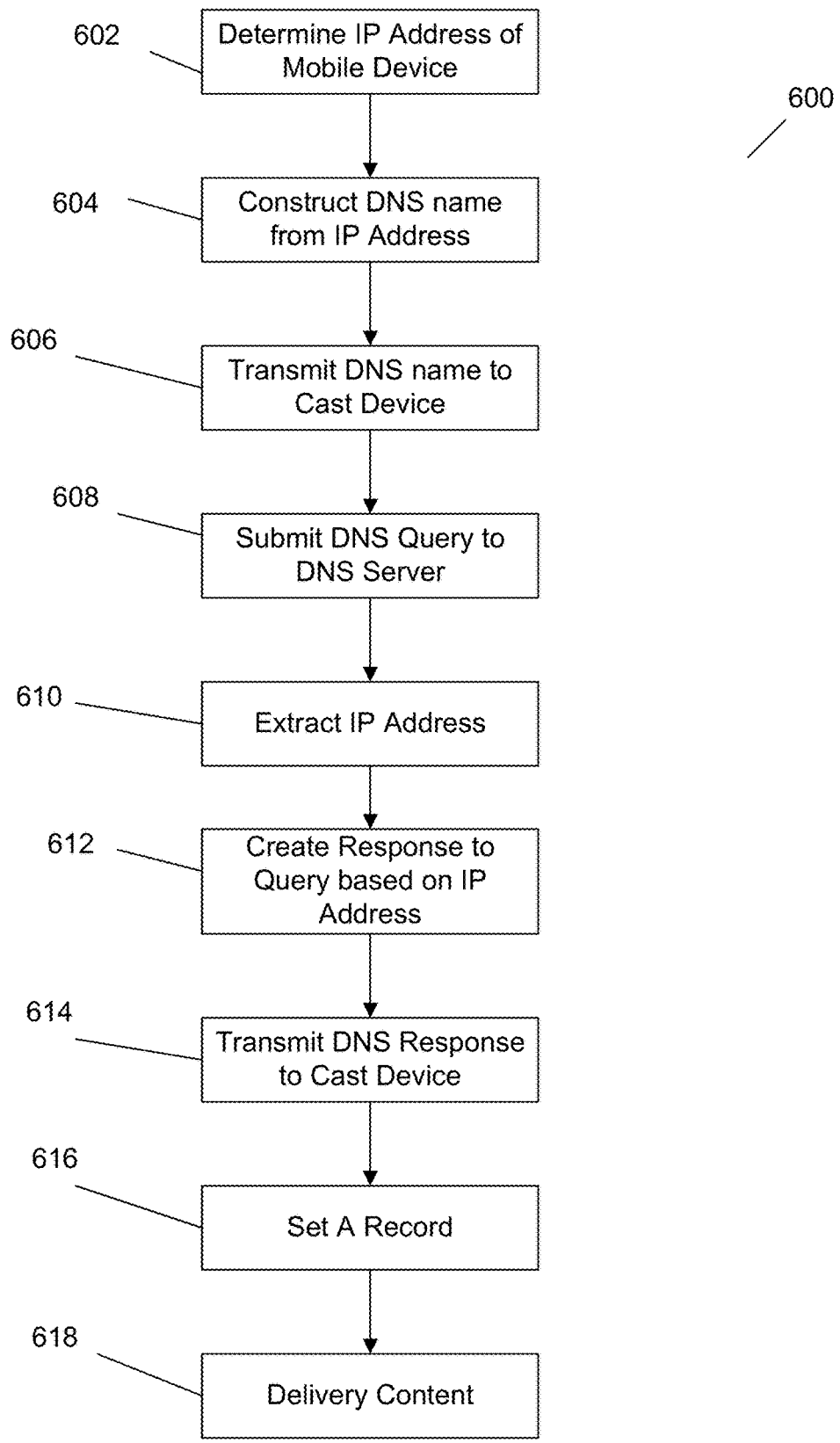
FIG. 6 depicts an embodiment of a system and method for delivery of content to a digital media player.
Figure 7:
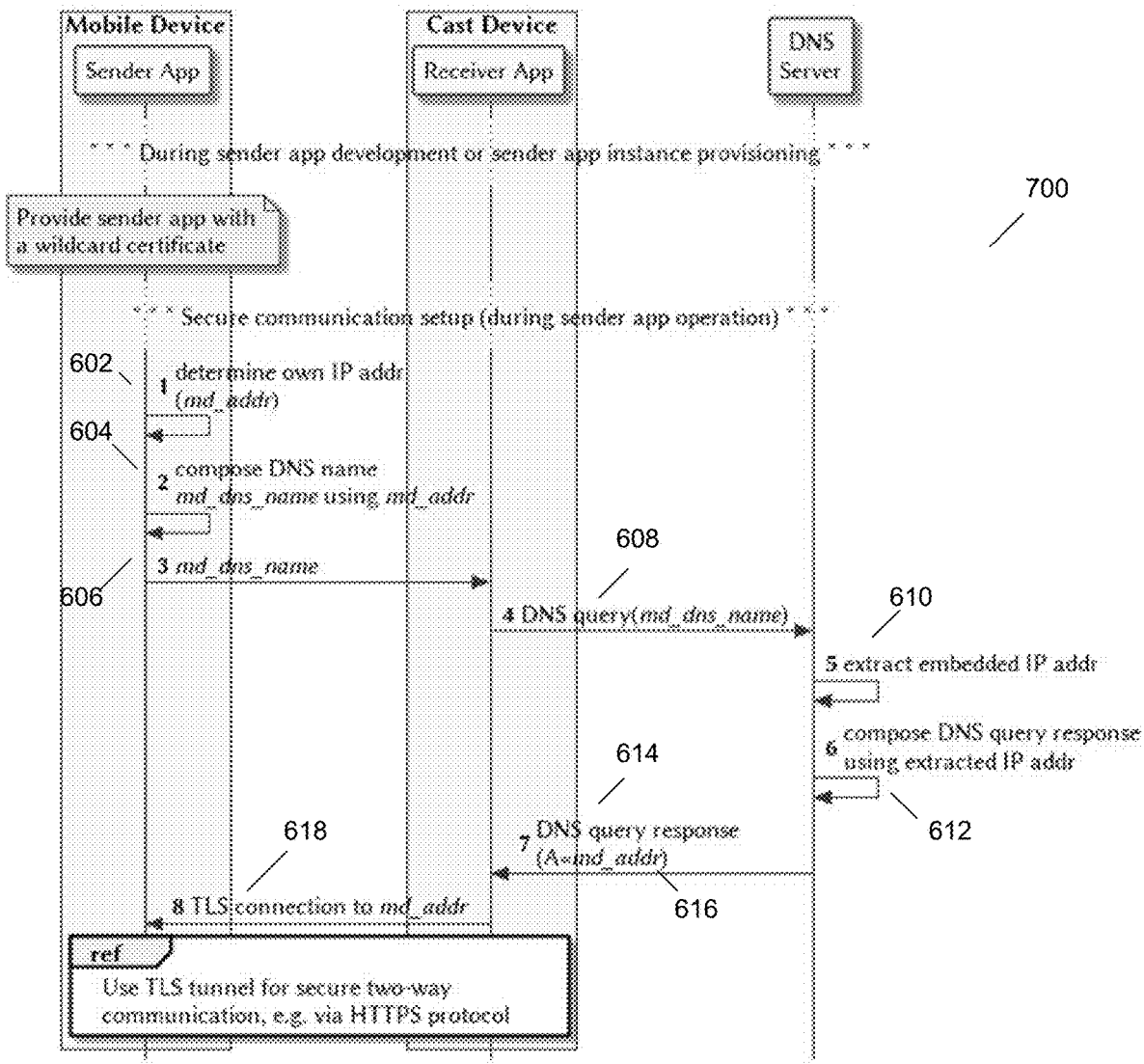
FIG. 7 depicts an alternate view of the embodiment of a system and method for delivery of content to a digital media player depicted in FIG. 6.

FIGS. 6 and 7 depict embodiments of a system and method 600 700 for delivery of content to a digital media player. In step 602, an IP address of a mobile device (and/or acquisition and transmission system 104) can be determined, then in step 604 a DNS name can be constructed using the IP address. In some embodiments the DNS name can be constructed by substituting a predefined delimiter character for the "." s in the IP address in what is known as a "dotted quad" notation. The delimiter character can be any character allowable in a DNS name and distinguishable from the characters of the individual components of an IP address. More generally, the special DNS name component described earlier is just an example of an encoded representation of an IP address. By way of non-limiting example, if the IP address of the mobile device is determined to be 192.168.1.7, then an associated DNS name can be 192s168s1s7.cast.iprm.us wherein the "." s in the IP address have been replaced with and "s" character and the modified IP address has been pre-appended to a DNS name, in this case "cast.iprm.us", to form the host part of a URL to be provided to the Google Cast device. In such an embodiment, the DRM server can be provided with a wildcard certificate of the form "*.cast.iprm.us". In step 606, this constructed DNS name is provided to the Google Cast device, as part of a URL Then in step 608 a DNS query can be submitted to a DNS server in step 608 which can use the submitted query to extract the IP address of the mobile device. In the non-limiting example previously provided this would result an address of 192.168.1.7 being extracted from the DNS name. Then in step 612 a response to the query can be created based, at least in part, on the extracted IP address. A DNS response including the extracted IP address can then be transmitted to the cast device in step 614 and then a TLS connection can be established in step 618 for content delivery.

In operation, a DNS name is generated containing embedded IP address info to identify the mobile DRM client to the Chromecast device. By way of non-limiting example a DNS name could be w-x-y-z.cast.iprm.us in which w-x-y-z is a representation of the IP address of the mobile device. A DNS server can then be established to resolve names under the cast.iprm.us domain. This DNS server can be a custom DNS server, which can resolve a DNS name of the prescribed special format to an IP address by extracting the encoded IP address from the DNS name, without relying on a database or table lookup. Such a DNS server can be hosted by a service or content provider or an outside party. In some embodiment, the domain of the DNS name used to facilitate secure communication between the sender device and the Cast device can be under the control of the service provider.

Then, in operation, the special DNS name is generated by the DRM client SDK on the mobile device and communicated to a custom receiver app on the digital media player (Chromecast device). In some embodiments this communication of the special DNS name can be communicated using a method that provides integrity protection. In some embodiments, the special DNS name may be conveyed as part of the content URL provided by the sender application to the receiver application during startup of casting. In alternate embodiments, the special DNS name can be sent to Chromecast device using secure messaging support also provided by the digital media player (Chromecast) platform.

In some embodiments, the following, exemplary and non-limiting steps can be implemented to establish a custom DNS server to implement the solution outlined above:

(1) Establish a DNS server set up for the domain (which is cast.iprm.us in the example described earlier)

(2) Establish a name for this DNS server (e.g. ns.cast.iprm.us)

(3) Instantiate an NS record specifying the DNS server as the authoritative DNS server for cast.iprm.us (4) instantiate an "A record" for resolving the name of the DNS server to an actual IP address Once again in operation, the DRM client SDK, which implements the key server on the sender device, can be provided with a wildcard certificate issued by a certificate authority trusted by the digital media player (Chromecast) device. Continuing with the non-limiting example above, such a certificate can have a subjectAltName (Subject Alternative Name, or SAN for short) of

*.cast.iprm.us

This wildcard SAN can match DNS names of the form w-x-y-z.cast.iprm.us. This can permit the key server on the sender device to accept TLS connections from standard TLS clients trying to establish a TLS connection to a server identified by a DNS name of the form w-x-y-z.cast.iprm.us.

In operation, if the HLS player on the digital media player (Chromecast) device communicates with the DRM client on a mobile device using the special DNS name described above and over HTTPS, the HLS player could refuse to talk to unknown servers for content key retrieval, because of server authentication in TLS.

Depending on the implementation in operation, if the custom receiver app sends secret credentials to the DRM client on the mobile device as a form of authentication, the custom receiver app can receive the special DNS name of the mobile DRM client with integrity protection. Such integrity-protected communication may be provided by the casting platform. In alternate embodiments, known authentication techniques (e.g. MAC, digital signature) may be used to authenticate the special DNS name. In still further alternate embodiments, the custom receiver app can validate the DNS name, e.g. rejecting an DNS name not of the form w-x-y-z.cast.iprm.us.

Figure 8:
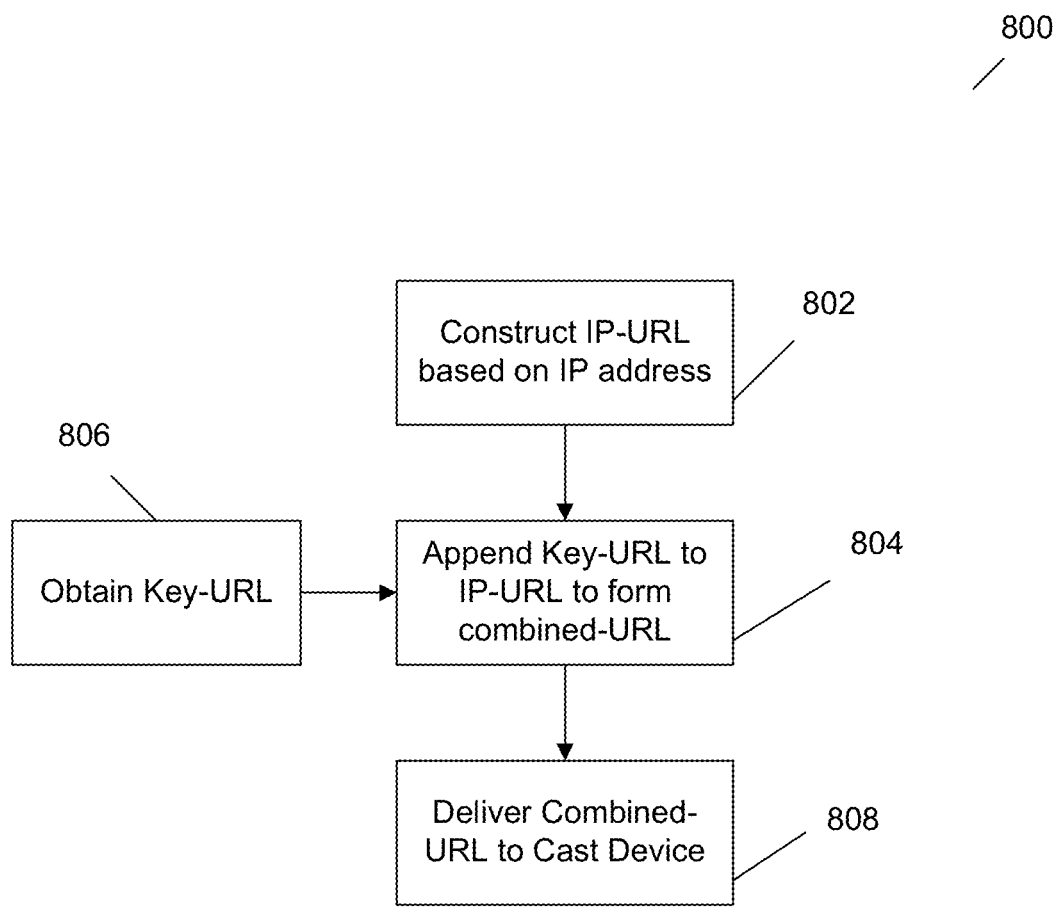
FIG. 8 depicts an embodiment of a system and method to provide a combined URL containing an IP address and content key URL.

FIG. 8 depicts an embodiment of a system and method 800 to provide a combined URL containing an IP address and content key URL.

In step 802 an IP-URL can be constructed based on the IP address of associated with the mobile device, as described above with reference to FIGS. 6 and 7. That is, the "." s associated with the IP address are substituted with a prescribed delimiter character or characters.

In step 804, a Key-URL portion, associated with the location of the content key(s) can be appended to the IP-URL to form a combined-URL, after a Key-URL is obtained in step 806.

The in step 808 the combined-URL can be delivered to the digital media player (cast or Chromecast) device for use in decoding and delivering the content to a display 102.

In operation, by way of non-limiting example, if the URL pattern received by the custom DNS server for DNS query were "192s168s1s7.iprm.us", the custom DNS can remove "s" and returns the IP address 192.168.1.7 for the DNS query. Then, the digital media player (cast Chromecast) device receiver application adds the DNS name to the Key URL. If, in some embodiments, the Key Server were running on the Android device with IP address 192.168.1.7, the modified Key URL would be, for example, https://192s168s1s7.iprm.us/key.txt. (Note that "key.txt" here is only an example value. In general, the trailing portion of the key URL contains whatever data that is needed by the DRM client to compute the content key.)

Figure 9:
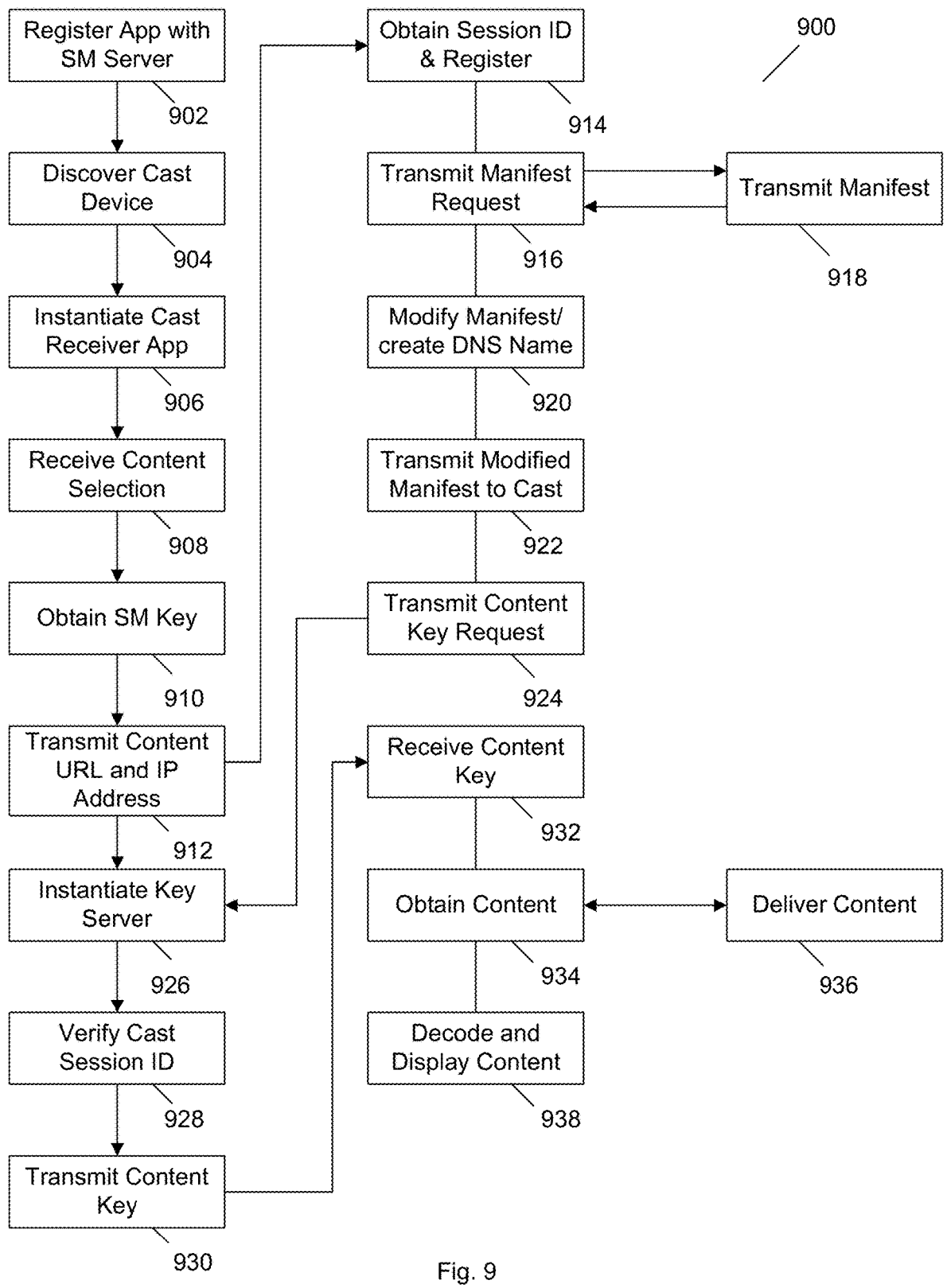
FIG. 9 depicts an embodiment of a system and method for direct content delivery to a digital media player.
Figure 10:
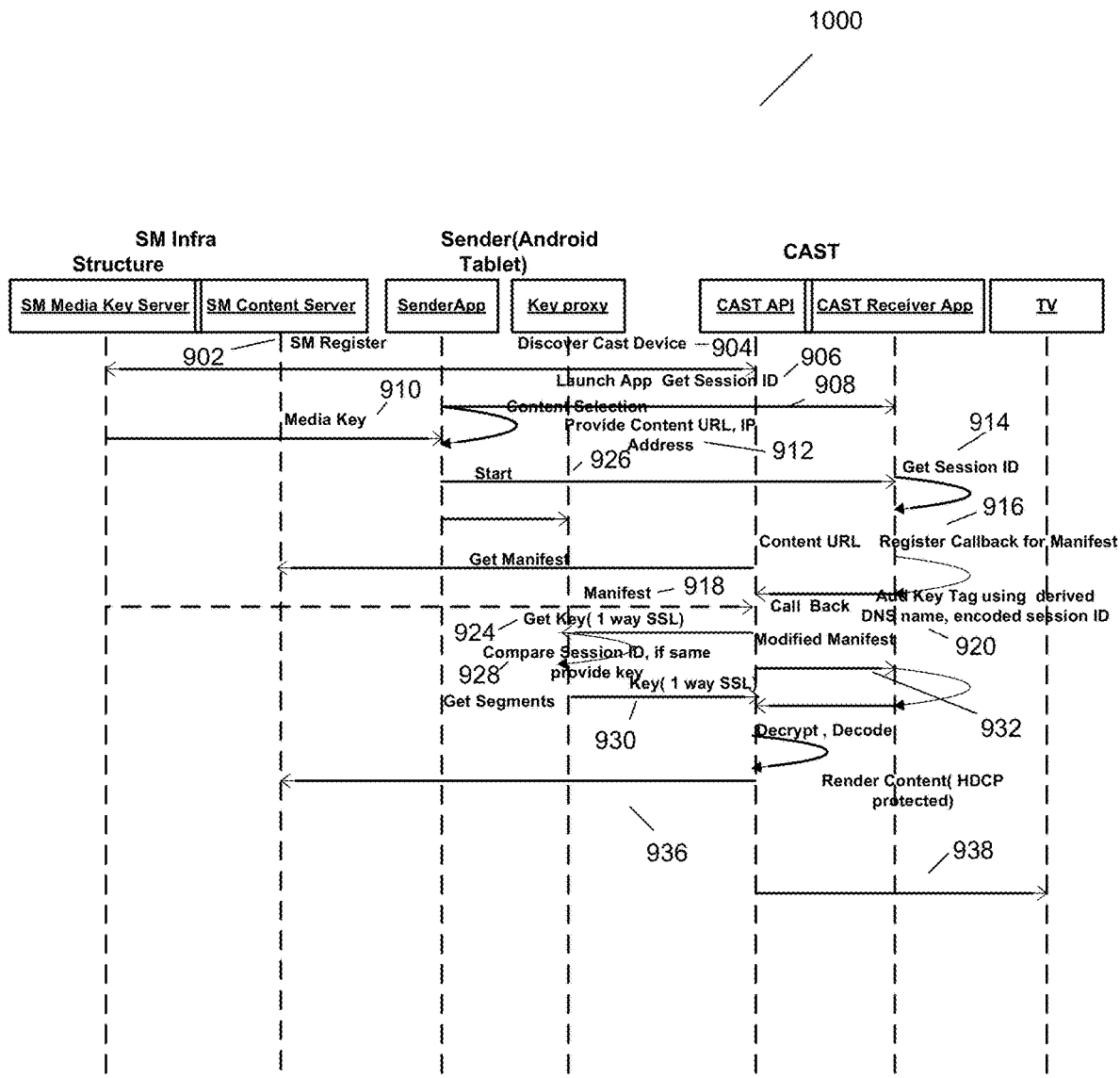
FIG. 10 depicts an alternate embodiment of a system and method for direct content delivery to a digital media player as depicted in FIG. 10.

FIGS. 9 and 10 depict embodiments of a system and method 900 1000 for direct content delivery to a digital media player. In the exemplary embodiment depicted in FIGS. 9 and 10, the cast receiver application can be registered with SecureMedia service in step 902. However, in some embodiments, where the cast receiver application has previously been registered, the step of registration 902 need not be completed.

In step 904 cast devices on a local network can be located and then in step 906 a cast receiver application can be instantiated on a cast device.

In step 908 a content selection can be received and a SecureMedia key can be retrieved in step 910. In step 912 a content URL, IP address of the key server located on a mobile device constructed in accordance with the above-provided description related to FIGS. 6-8. A casting session than be registered in step 914 and a manifest request can be transmitted in step 916 and a manifest returned in step 918.

In step 920 a modified manifest can be created and a key URL with a custom DNS name can be generated.

In step 924 a content key request is transmitted to the instantiated key server. In some embodiments the key server can be instantiated following step 912. However, in alternate embodiment, the instantiation of the key server can be delayed and instantiated upon transmission in step 924 and/or any time between steps 912 and 024. Then in step 928 a cast session ID can be verified and content keys can be transmitted to the digital media player (cast) device in step 930 and received by the digital media play (cast) device in step 932. The in step 934 the digital media player (cast) device can obtain the content by transmission from the content provider 936. Then in step 938, the digital media player (cast) device can decode and display the content on a display 102.

In operation, the sender application can be part of a main application running on an Android/iOS device. The sender application can discover Cast devices in the local network and provide the content Uniform Resource Identifier (URI) to the receiver application for content playback. The media secure client (MSC) SDK can comprise API enhancements to support the specific digital media player (Cast) device. The key server on the sender device can be part of the MSC SDK and can be initiated when Cast content playback is requested. In some embodiments, the key server can be obfuscated for security.

Figure 11:
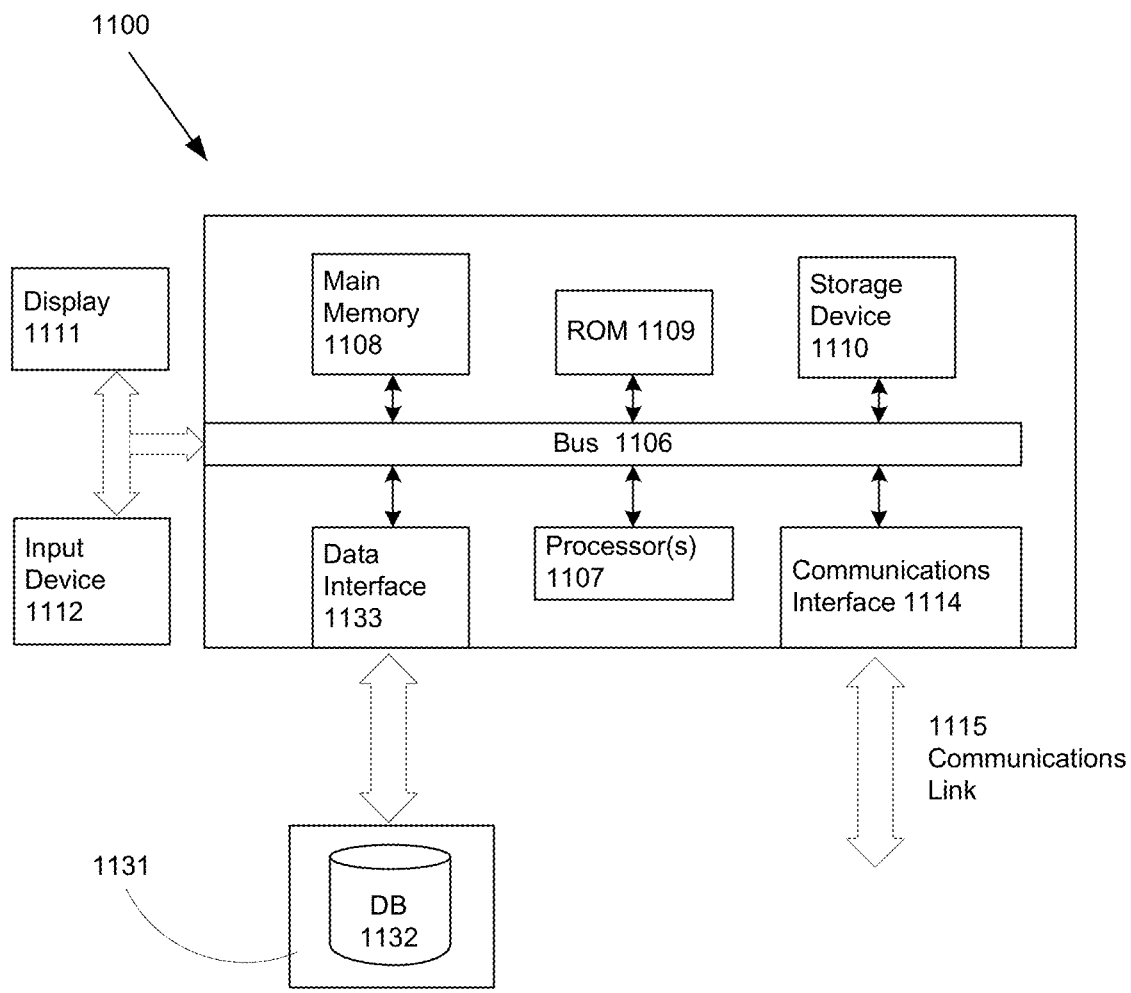
FIG. 11 depicts an embodiment of a computer system adapted and configured to implement the systems and methods depicted in FIGS. 1-10.

The execution of the sequences of instructions required to practice the embodiments can be performed by a computer system 1100 as shown in FIG. 11. In an embodiment, execution of the sequences of instructions is performed by a single computer system 1100. According to other embodiments, two or more computer systems 1100 coupled by a communication link 1115 can perform the sequence of instructions in coordination with one another. Although a description of only one computer system 1100 will be presented below, however, it should be understood that any number of computer systems 1100 can be employed to practice the embodiments.

A computer system 1100 according to an embodiment will now be described with reference to FIG. 11, which is a block diagram of the functional components of a computer system 1100. As used herein, the term computer system 1100 is broadly used to describe any computing device that can store and independently run one or more programs.

Each computer system 1100 can include a communication interface 1114 coupled to the bus 1106. The communication interface 1114 provides two-way communication between computer systems 1100. The communication interface 1114 of a respective computer system 1100 transmits and receives electrical, electromagnetic or optical signals, that include data streams representing various types of signal information, e.g., instructions, messages and data. A communication link 1115 links one computer system 1100 with another computer system 1100. For example, the communication link 1115 can be a LAN, in which case the communication interface 1114 can be a LAN card, or the communication link 1115 can be a PSTN, in which case the communication interface 1114 can be an integrated services digital network (ISDN) card or a modem, or the communication link 1115 can be the Internet, in which case the communication interface 1114 can be a dial-up, cable or wireless modem.

A computer system 1100 can transmit and receive messages, data, and instructions, including program, i.e., application, code, through its respective communication link 1115 and communication interface 1114. Received program code can be executed by the respective processor(s) 1107 as it is received, and/or stored in the storage device 1110, or other associated non-volatile media, for later execution.

In an embodiment, the computer system 1100 operates in conjunction with a data storage system 1131, e.g., a data storage system 1131 that contains a database 1132 that is readily accessible by the computer system 1100. The computer system 1100 communicates with the data storage system 1131 through a data interface 1133. A data interface 1133, which is coupled to the bus 1106, transmits and receives electrical, electromagnetic or optical signals, that include data streams representing various types of signal information, e.g., instructions, messages and data. In embodiments, the functions of the data interface 1133 can be performed by the communication interface 1114.

Computer system 1100 includes a bus 1106 or other communication mechanism for communicating instructions, messages and data, collectively, information, and one or more processors 1107 coupled with the bus 1106 for processing information. Computer system 1100 also includes a main memory 1108, such as a random access memory (RAM) or other dynamic storage device, coupled to the bus 1106 for storing dynamic data and instructions to be executed by the processor(s) 1107. The main memory 1108 also can be used for storing temporary data, i.e., variables, or other intermediate information during execution of instructions by the processor(s) 1107.

The computer system 1100 can further include a read only memory (ROM) 1109 or other static storage device coupled to the bus 1106 for storing static data and instructions for the processor(s) 1107. A storage device 1110, such as a magnetic disk or optical disk, can also be provided and coupled to the bus 1106 for storing data and instructions for the processor(s) 1107.

A computer system 1100 can be coupled via the bus 1106 to a display device 1111, such as, but not limited to, a cathode ray tube (CRT) or a liquid-crystal display (LCD) monitor, for displaying information to a user. An input device 1112, e.g., alphanumeric and other keys, is coupled to the bus 1106 for communicating information and command selections to the processor(s) 1107.

According to one embodiment, an individual computer system 1100 performs specific operations by their respective processor(s) 1107 executing one or more sequences of one or more instructions contained in the main memory 1108. Such instructions can be read into the main memory 1108 from another computer-usable medium, such as the ROM 1109 or the storage device 1110. Execution of the sequences of instructions contained in the main memory 1108 causes the processor(s) 1107 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 1107. Such a medium can take many forms, including, but not limited to, non-volatile, volatile and transmission media. Non-volatile media, i.e., media that can retain information in the absence of power, includes the ROM 1109, CD ROM, magnetic tape, and magnetic discs. Volatile media, i.e., media that can not retain information in the absence of power, includes the main memory 1108. Transmission media includes coaxial cables, copper wire and fiber optics, including the wires that comprise the bus 1106. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

A memory or storage device may be an example of a non-transitory computer-readable storage medium for use by or in connection with the video encoder and/or decoder. The non-transitory computer-readable storage medium contains instructions for controlling a computer system to be configured to perform functions described by particular embodiments. The instructions, when executed by one or more computer processors, may be configured to perform that which is described in particular embodiments.

Also, it is noted that some embodiments have been described as a process which can be depicted as a flow diagram or block diagram. Although each may describe the operations as a sequential process, many of the operations can be performed in parallel or concurrently. In addition, the order of the operations may be rearranged. A process may have additional steps not included in the figures.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

What is claimed:

1. A method comprising:
 instantiating a key server on a first device;
 determining an IP address of said first device;
 constructing, an URL based at least in part on said IP address of said first device, wherein: said URL identifies said first device using a DNS name, and said DNS name contains a representation of said IP address;
 delivering said URL to a digital media player, wherein said digital media player transmits said DNS name to a domain name server and receives said IP address in response;
 accessing said URL from said digital media player;
 said digital media player accessing said key server using said IP address to obtain a content key;
 said digital media player accessing a content server to obtain digital content in a protected form; and said digital media player transmitting said digital content to a display device in a form renderable by said display device based, at least in part on use of said content key.

2. The method of claim 1 wherein said first device is a mobile computing device.

3. The method of claim 1, further comprising:
determining the content key associated with said key server;
wherein constructing said URL is based at least in part on said content key.

4. The method of claim 1 further comprising:
instantiating a domain name server configured to extract said IP address from said DNS name.

5. The method of claim 1, wherein:
said key server is equipped with a wildcard certificate trusted by the digital media player; and
said DNS name is a subject name matched by said wildcard digital certificate.

6. The method of claim 5, further comprising using said wildcard digital certificate to set up a secure communication connection between said digital media player and said key server.

7. The method of claim 1, wherein said key server is coupled with a DRM client of a DRM system.

8. The method of claim 7,
wherein said digital media player accessing said key server using said IP address to obtain a content key further comprises:
using a key obtained by said DRM client from said DRM system to provide a content key to said digital media player in response to a request from said digital media player.

9. The method of claim 1 wherein said digital media player resides on a second device separate from said first device.

* * * * *